Aug. 9, 1960  E. S. JOLINE  2,948,496
SPEED CONTROLLING SYSTEM FOR AIRCRAFT
Filed Jan. 9, 1957
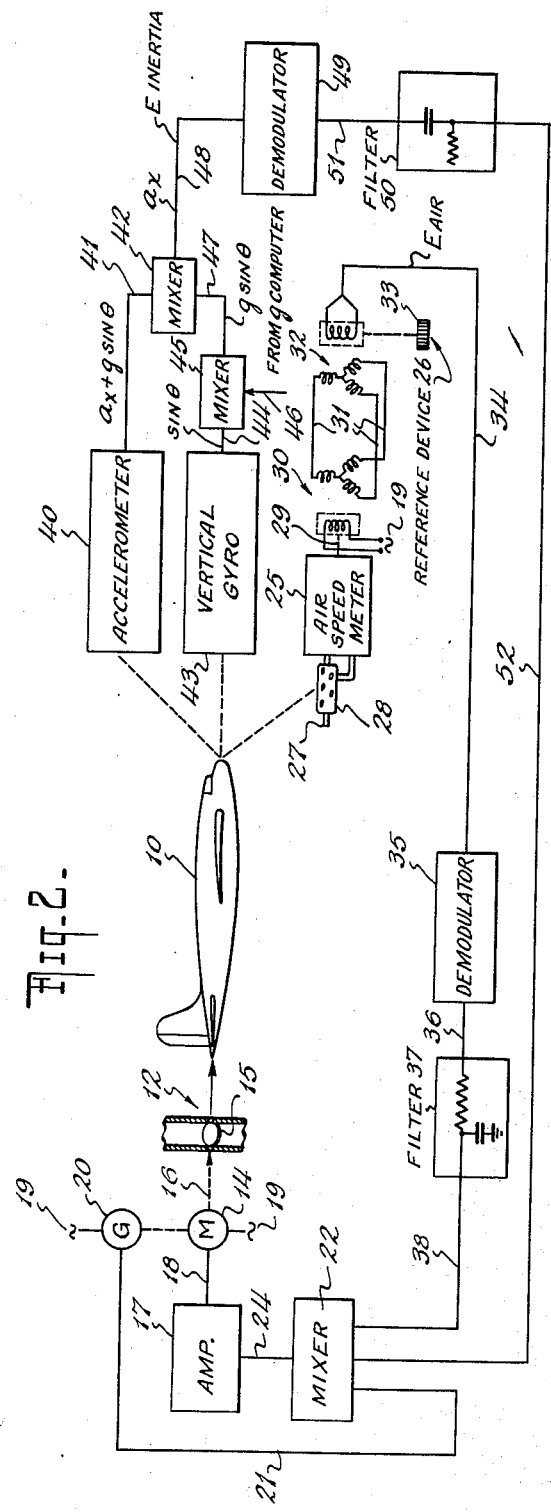
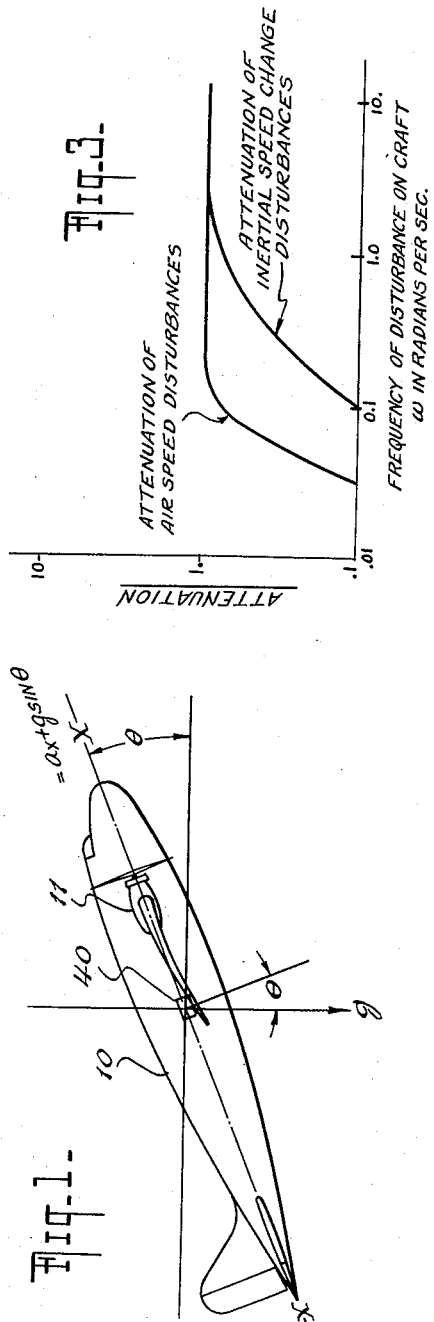
INVENTOR
EVERETT S. JOLINE
BY
Arthur H. Serrell
ATTORNEY United States Patent Office 2,948,496
Patented Aug. 9, 1960

2,948,496
SPEED CONTROLLING SYSTEM FOR AIRCRAFT

Everett S. Joline, Huntington Station, N.Y., assignor to Sperry Rand Corporation, a corporation of Delaware Filed Jan. 9, 1957, Ser. No. 633,281

9 Claims. (Cl. 244—77)

This invention relates to an improvement in systems for controlling the forward speed of an aircraft. The improved system includes inertial means responsive to changes in craft velocity such as an accelerometer and a meter responsive to changes in the speed of the craft in relation to the surrounding air mass, the control being preferably effective along the craft's fore and aft or longitudinal axis. Other axes could be employed such as those that lie in close proximity to the fore and aft axis of the craft. For the purpose of explaining the present invention, we will assume the following. First, that the accelerometer or other means for determining inertial change in velocity of the craft is arranged to measure acceleration along the fore and aft axis of the craft. Secondly, that the air speed meter of the system is arranged to measure the speed of the craft relative to the surrounding air mass along the horizontal. It is also assumed, that the system controls the forward speed of the craft along the horizontal. Of course, other axes may be employed along which the craft's forward speed is controlled and along which the desired measures are obtained.

Single loop control systems of the type shown in the Bromley Patent No. 2,626,767, issued January 27, 1953, attempt to control the air speed of a large inertial body such as an airframe with a relatively high longitudinal time constant through its prime movers from an air speed reference signal containing rapidly varying components caused by gusts and wind transients to which the system is sensitive but to which the airframe cannot possibly respond. This results, in the case of an aircraft, in ineffectual and constant motion of the throttle controls which tends to strain the prime movers and is disconcerting to the human pilot. In such systems, it is not possible to maintain extremely accurate air speed in windy conditions because of the limits on the excess of thrust over drag that can be obtained and the limits on the rate at which the prime movers or engines of the craft can be accelerated. If the gain around the closed loop of such an air speed control system is made high in order to maintain more accurate control, it is possible that less accurate control will be realized since wind gusts or transients will tend to saturate the servo controls for the engine throttles and the engine itself. For this reason non-linearities must be considered in the design of such a single loop air speed control system.

The improved system includes both air speed and inertial speed sensing control servo loops. The effect of the wind transients in the air speed loop of the system is eliminated by filtering the air speed control signal so that components therein higher than a predetermined frequency such as would be caused by the gusts are attenuated. This loop of the system accordingly functions to provide long period stabilization of speed of the craft with respect to an air reference. The inertial speed sensing servo loop of the improved system operates in the frequency range filtered from the air speed control loop to provide short period stabilization for the system. The control signal of this speed change sensing loop is relatively free of the effect of gusts on the airframe of the craft. An object of the invention is to provide an overall speed controlling system for aircraft that is unaffected by wind gusts and provides accurate short period speed control as well as average long period control.

With the foregoing and still other objects in view, my improved system includes the novel combination and arrangement of components described below and illustrated in the accompanying drawing which diagrammatically shows a preferred form and specific embodiment thereof. In the drawing, Fig. 1 is a pictorial view of an aircraft in climbing flight showing the position of the inertial speed sensing or accelerometer unit of the system along the fore and aft or longitudinal axis thereof, Fig. 2 is a combined diagrammatic view and circuit diagram of an arrangement of components constituting the preferred form of the invention, and Fig. 3 is a curve that is used in explaining the operation of the improved dual servo loop control system.

In the drawing, I have shown a system for governing or controlling the forward speed of an aircraft by regulation of its prime movers or engines through a throttle valve and servo operating means for the valve. Such illustrative structure constitutes the component of the system providing a means for controlling the forward speed of the craft along its longitudinal axis or with reference to a line of flight in a horizontal plane. Such structure also constitutes the means operable to control the prime mover means of an aircraft. The improved dual loop servo system is effective through motor operation of the throttles or other equivalent speed control means to close the loop through the response of the craft itself in adjusting its speed in accordance with the teaching of the present invention.

As represented in the drawing, the aircraft element of the dual loop system is indicated at 10. One of the engines or prime movers for controlling the forward speed of the craft is indicated at 11 and the throttle for governing the speed of operation of the engine 11 is illustratively depicted at 12. Motive means or motor 14 of the combination is common to both servo loops and is operatively connected to the valve component 15 of the throttle 12 by way of shafting 16. The motor 14 of the system is accordingly operable to control the speed of the aircraft 10 through regulation of the throttle valve 15 and the effect thereof on the engines or prime movers of the aircraft. Motor 14 is illustratively depicted as a two-phase induction electric motor whose control phase winding is energized by the output of a suitable amplifier 17 by way of lead 18 and whose fixed phase winding is energized from a suitable source of alternating current energy such as indicated at 19. To damp the operations of motor 14, I provide a feedback signal from a suitable speed generator 20 that is coupled to and driven by the motor 14. Generator 20 functions to provide an A.C. voltage output which in amplitude is proportional to the speed of the motor 14. The phase of the generator output signal is dependent in the sense of rotation of the motor 14. The signal of generator 20 is fed to the amplifier 17 by way of lead 21, mixer 22 and lead 24. The damping control described for the motor 14 of the system is illustrative and may be provided by other known devices for performing this function.

The air speed change responsive loop of the improved system operates to provide long period control of the speed of the craft with respect to the air. Like the system of the heretofore noted Bromley Patent 2,626,767, this loop includes an air speed sensor or meter schematically depicted at 25 and a settable reference device 26 that provide an output for controlling the motor 14 in accordance with changes in the air speed of the craft with respect to the setting of the reference device. Meter 25 may be of the type shown in the Bromley patent with a Sylphon bellows supplied with total air pressure by means of tube 27. The static pressure tube 28 supplies pressure to the housing of the meter 25. The meter 25 is fixedly carried by the craft 10 with the respective tubes located in the slip stream thereof and the tube 27 located in a normally horizontal plane and directed in a forward position. In the described arrangement, the bellows of meter 25 is connected through a suitable mechanical structure converting translational motion to rotary motion to control the angular position of a shaft 29 having the rotor of a conventional electrical transmitter 30 of the Selsyn type or other suitable pick-off rotor thereon. The three phase stator of the illustrated pick-off or transmitter 30 is fixed in relation to the craft and is connected by way of leads 31 to the stator of a similarly located receiver Selsyn device 32. Alternating current energy from source 19, is supplied to the rotor of the pick-off 30. The rotor of the device 32 is shown as set by a knob 33 under control of the human pilot, the setting being accomplished by turning a suitable pointer on the knob with respect to an air speed scale until the air speed of the craft desired by the human pilot is reached. The knob 33 and receiver 32 accordingly form a reference device that with the described air speed meter arrangement provides a control signal that is proportional to errors in the speed of the craft with relation to the surrounding air mass as noted as $E_{air}$ in the drawing. The $E_{air}$ signal is due to changes in the air speed of the airframe with respect to the setting of the reference device 26. It will be understood, that the signal output from the rotor of receiver device 32 is null when the angular position of the shaft 29 as controlled by meter or sensor 25 is in accordance with the angular setting of the knob 33.

The air speed change sensing loop of the system constructed in accordance with the present invention includes means for filtering the $E_{air}$ error output of the meter 25 and device 26 to block the components thereof of a frequency resulting from gusty wind conditions. As represented in Fig. 2, the $E_{air}$ signal from rotor of receiver device 32 is utilized to control the operation of motor 14 being fed thereto by way of lead 34, demodulator 35 which functions to remove the carrier frequency of the signal source 19, lead 36, electrical filter 37, lead 38 from the filter 37 to mixer 22, lead 24, amplifier 17 and motor input lead 18. The resistance and capacitance elements of the filter 37 are chosen so as to pass the components of the $E_{air}$ signal below a predetermined frequency. As represented in Fig. 3, this point of differentiation is selected at a value corresponding to craft disturbances of a frequency of approximately .10 radians per second. Disturbances due to gust and wind transients in the particular craft in which the improved system is utilized are of a frequency above this selected value. The elements of the filter 37 accordingly block the components in the $E_{air}$ signal of a frequency resulting from gusty wind conditions. The air speed change sensing servo loop is accordingly only responsive to control signals below the predetermined frequency blocked by the filter 37. As shown in Fig. 3 by the curve designated attenuation of air speed disturbances, the air speed loop attenuates the effects of wind and gust disturbances on air speed below 0.1 radians per second. Other means than the filter 37 could be incorporated in the air speed loop to accomplish this result without departing from the present inventive concepts. The components of the air speed loop in the improved system are also so chosen that the response time is relatively slow with relation to the responsive time of the hereinafter described inertial speed change sensing or accelerometer loop and the gain of the overall loop is relatively low as compared with the gain of the latter loop. The air speed servo loop accordingly functions to provide long period control of the speed of the aircraft with relation to the surrounding air mass which maintains the craft at a desired average air speed in accordance with the setting of the knob 33. As the gust components of the controls for this servo loop have been eliminated over control of the throttle valve 15 of the system has been avoided.

Further, in accordance with the present inventive concepts, a second servo loop of the system including the common motor 14 operates to provide a short period control of the speed of the aircraft along an axis that is approximately fore and aft of the craft. As shown in Figs. 1 and 2, this loop includes an accelerometer indicated at 40 that may be of the type shown in Draper Patent 2,332,994, issued October 26, 1943, for an acceleration measuring device. Device 40 provides an electrical control output signal $E_{inertia}$ in accordance with changes in speed of the aircraft along its longitudinal axis X—X. The device 40 is preferably mounted on the craft 10 in a position to be responsive to speed changes along the craft axis X—X at the approximate center of gravity location of the craft. To correct the output of the accelerometer 40 for the effect of gravity $g$ and angular inclination $\theta$ of the aircraft from a level flight condition about its pitch axis, it is necessary to remove the factor indicated in the drawing as $g \sin \theta$ from its total output represented as $a_x + g \sin \theta$ on the lead 41 connecting the accelerometer 40 to mixer 42. This is accomplished as indicated in the drawing by a suitable vertical gyro 43 carried by the craft 10 with an electrical pick-off at its pitch axis that provides an output in accordance with the sine of the angle of the pitch $\theta$ of the craft from a level condition. Such a signal is carried by lead 44 from the gyro 43 to a mixer 45 where it is combined with the output of a suitable acceleration of gravity computer by way of lead 46. For most applications $g$ may be assumed constant and equal to 32 feet per second per second. The output of the mixer 45 carried by lead 47 to mixer 42 cancels the $g \sin \theta$ factor from the output of the accelerometer 40. The vertical gyro and $g$ computer provide means for correcting the output of the accelerometer for the effect of gravity thereon and for inclination of the craft from a level flight condition about its pitch axis. The output of the mixer 42 is the corrected accelerometer error signal indicated at $E_{inertia}$ on lead 48. The inertial speed change sensing servo loop shown in Fig. 2 further includes a demodulator 49 receiving the $E_{inertia}$ signal by way of lead 48 that functions in a manner similar to demodulator 35 to remove the carrier frequency in the output of the accelerometer. The resultant signal is then supplied to a filter 50 by way of lead 51 before being fed the motor 14 of the loop. The resistance and capacitance components of filter 50 are such as to pass only the components of the $E_{inertia}$ signal that are of a frequency that are blocked by the filter 37 in the air speed loop. The frequencies passed by the filter 50 accordingly correspond to the frequencies represented in Fig. 3 that are above the point of differentiation of .10 radians per second. As shown in Fig. 3 by the designated attenuation of inertial speed change disturbance curve, the inertial speed change sensing loop attenuates the effects of wind gust or maneuvering disturbances on inertial speed below 1.0 radians per second. The signals passed by the filter 50 are fed the motor 14 by way of lead 52, mixer 22, lead 24, amplifier 17 and lead 18. The second servo loop of the system accordingly functions to provide short period control of the speed of the craft. Its components are selected so that the responsive time of the closed accelerometer control loop is relatively higher than that of the air speed control loop and the gain of the accelerometer loop is relatively higher than that of the air speed loop. The dual servo loops operate through the common motor 14 to provide an overall speed controlling system for aircraft that is unaffected by wind gusts and provides accurate accelerometer regulation as a short period control and average air speed regulation as a long period control. The numerical values noted herein are illustrative only as utilized in a system of the character described for a particular aircraft.

While I have described my invention in its preferred embodiment, it is to be understood that the words which I have used are words of description rather than of limitation and that changes within the purview of the appended claims may be made without departing from the true scope and spirit of my invention in its broader aspects.

What is claimed is:

1. The combination in an aircraft speed controlling system of, a motor operable to control the speed of the aircraft, a first servo loop including said motor operating to provide long period system control having an air speed meter and reference device providing a control output in accordance with changes in the air speed of the aircraft with respect to the reference device, and a second servo loop including said motor operating to provide short period system control having an accelerometer providing a control output in accordance with changes in speed of the aircraft along its longitudinal axis, and means for correcting the output of said accelerometer for the effect of gravity and inclination of the aircraft from a level flight condition about its pitch axis.

2. An aircraft speed controlling system having motive means operable to control the prime mover of the aircraft, a relatively slow acting, low gain, signal frequency selective, servo loop including said motive means and aircraft effective to operate said motive means in accordance with signals below a predetermined frequency having an air speed meter and reference device providing a control signal for the loop with departure of the aircraft from a reference air speed, and a relatively fast acting, high gain, servo loop including said motive means and aircraft having an accelerometer providing a control signal for the loop in accordance with changes in the speed of the aircraft along its longitudinal axis, and means for correcting the output of said accelerometer for the effect of gravity and inclination of the aircraft from a level flight condition about its pitch axis.

3. A system for controlling the speed of an aircraft comprising means for controlling the forward speed of the aircraft, an air speed sensor and reference means providing an output in accordance with deviations of the aircraft from a reference air speed, means for filtering the output of said sensor and reference means to block the components thereof of a frequency resulting from gusty wind conditions, an accelerometer providing an output with changes in the speed of the aircraft along its longitudinal axis, means for correcting the output of said accelerometer for the effect of gravity thereon and for inclination of the craft from a level flight condition about its pitch axis, and motive means connected to operate said forward speed controlling means in accordance with the output of said filtering means to provide long period system control and in accordance with the output of said correcting means to provide short period system control.

4. A system of the character claimed in claim 3, in which said filtering means is an electrical filter that passes the components of the output of said sensor and reference means that are below a predetermined frequency.

5. In a speed controlling system for aircraft that includes an air speed controlled servo loop with a motor providing long period control of the aircraft, the combination of, a short period control loop including the motor of the air speed loop, and an accelerometer providing an output for operating said motor in accordance with changes in the speed of the aircraft along an axis approximately fore and aft of the craft, and means for correcting the output of said accelerometer for the effect of gravity and inclination of the craft from a level flight condition about its pitch axis.

6. The combination in an aircraft with prime mover means of, a relatively slow acting servo loop having means for sensing changes in the air speed of the aircraft from a reference air speed providing a controlling output, a relatively fast acting servo loop having an accelerometer providing a controlling output in accordance with changes in the speed of the aircraft along an axis approximately fore and aft of the craft, and motive means common to both loops responsive to the respective controlling outputs of the air speed sensor and accelerometer operatively connected to said prime mover means to control the speed of the aircraft.

7. The combination claimed in claim 6, in which said slow acting servo loop includes an electrical filter that blocks components in the output of said air speed sensing means of a frequency resulting from wind gusts.

8. The combination claimed in claim 6, in which said fast acting servo loop includes an electrical filter that blocks components in the output of said accelerometer below a predetermined frequency.

9. In a speed controlling system for aircraft that includes an air speed controlled servo loop with a motor providing long period control of the aircraft, the combination of, a short period control loop including the motor of the air speed loop, inertial speed change sensing means at the fore and aft axis of the craft providing an output, means for correcting the output of said inertial speed change sensing means for the effect of gravity and inclination of the craft from a level flight condition about its pitch axis, and means for operating said motor in accordance with the corrected output of said inertial speed change sensing means.

No references cited.